June 7, 1938.   J. SCHIERENBECK   2,119,651
FLANGED JOINT OF TUBULAR CONDUITS
Filed Feb. 9, 1937   2 Sheets-Sheet 1

Julius Schierenbeck
INVENTOR

BY Kutz and Joslin
HIS ATTORNEYS

June 7, 1938.  J. SCHIERENBECK  2,119,651
FLANGED JOINT OF TUBULAR CONDUITS
Filed Feb. 9, 1937  2 Sheets-Sheet 2

Julius Schierenbeck
INVENTOR

BY Houtz and Joslin
HIS ATTORNEYS

Patented June 7, 1938

2,119,651

UNITED STATES PATENT OFFICE 2,119,651

FLANGED JOINT OF TUBULAR CONDUITS

Julius Schierenbeck, Heidelberg, Germany, assignor to I. G. Farbenindustrie Aktiengesellschaft, Frankfort-on-the-Main, Germany Application February 9, 1937, Serial No. 124,806
In Germany February 13, 1936

7 Claims. (Cl. 285—131)

The present invention relates to flanged joints of tubular conduits.

Flanged joints of tubular conduits, in particular of high pressure conduits, which are to be exposed to high temperatures have the drawback that they become leaky upon sudden cooling of the conduits because the screw bolts, which are relatively far removed from the tubes, cool and contract less rapidly than the tubes and because moreover the thermal stresses occurring may lead to increased strain on the flanged joints.

I have now found that the said drawback is avoided by providing, in addition to the connecting bolts and for the unloading of the same, connecting wedges which are arranged in the direct neighbourhood of the walls of the tube and which are in good heat-conducting connection with the tubular conduit so that they may readily follow its temperature fluctuations.

The nature of the invention will be further described with reference to the accompanying drawings, but the invention is not restricted to the particular arrangements shown.

Figure 1:
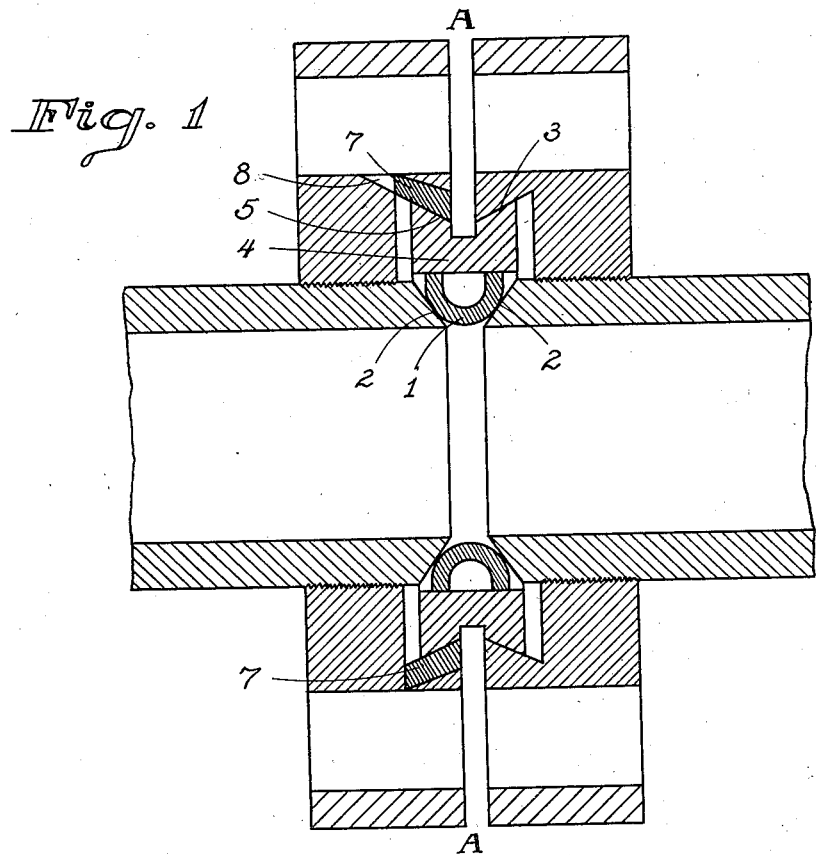
Fig. 1 is a longitudinal section of the new flange joint attached to pipes.

Referring to Figure 1, the new flange joint comprises a packing ring 1 which consists of a steel which is not too hard, preferably of U-shaped cross-section, the faces of which are pressed from outside against the slopingly turned ends 2, 2 of the conduits to be joined by means of connecting wedges 4 pressed between the outer periphery of the said packing ring and the correspondingly turned wedge surfaces 3, 3 of the connecting flanges.

Figure 2:
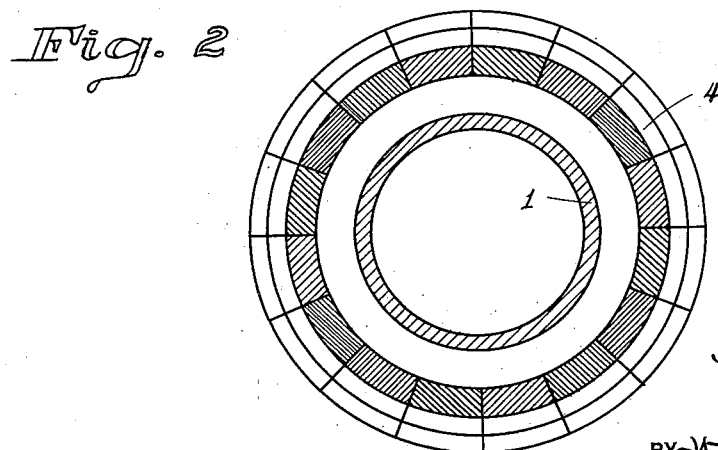
Fig. 2 is a cross sectional view taken on the line A—A of Fig. 1.
Figure 3:
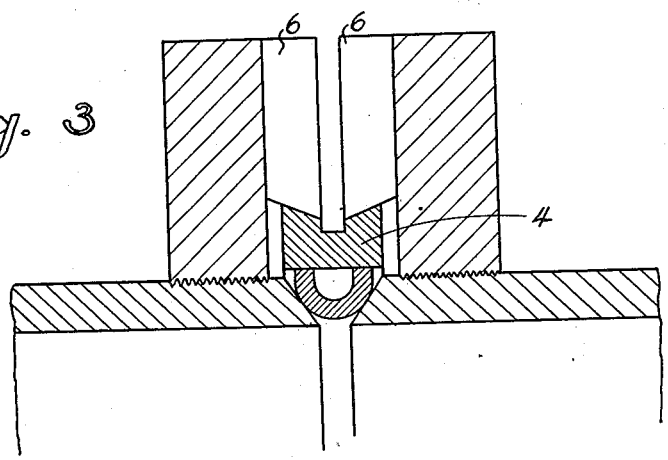
Fig. 3 is a longitudinal section taken at the point of the flange at which the connecting wedges 4 are introduced.

The connecting wedges 4 have the form of ring segments, as shown in Figure 2 which is a section on the line A—A, Figure 1, showing only the packing ring and the connecting wedges 4. A wedge-shaped groove 5, as shown in Figure 1, is cut in their outer surface transversely to the axis of the tubes. Figure 3 shows the part of the flanges at which the connecting wedges 4 are introduced in the form of ring segments. The wedges are introduced through radial grooves 6 provided in the flanges on sides opposed to each other. Before tightening the connecting bolts, the connecting wedges have just sufficient play to enable them readily to be pushed between the packing ring 1 and the wedge surfaces 3, 3.

The slope of the wedge surfaces 3, 3 is less steep than that of the wedge surfaces 2, 2; thus, in spite of the same horizontal movement when pushing the flanges together, the thrust of the steep wedge surfaces 2, 2 in an outward radial direction is greater than the deflected displacement of the wedge surfaces 3, 3 in a radial direction. This has the result that even after slight drawing together of the flange connecting bolts, the connecting wedges 4 forced radially outwards by elastic deformation of the packing ring 1 contact firmly against the wedge surfaces 3, 3, and by further drawing together the packing ring 1 is strained to such an extent that the connecting wedges keep the two flanges together in an entirely tight manner even after loosening the connecting bolts.

Any leakage of the flanged joint by reason of the cooling of the bolts and conduits at different speeds is therefore excluded. The joint also has the further advantage that in the case of any leakage or subsidence in the elasticity of the packing ring, any spurting or spraying out of the medium flowing in the conduit is prevented by the connecting wedges.

Figure 4:
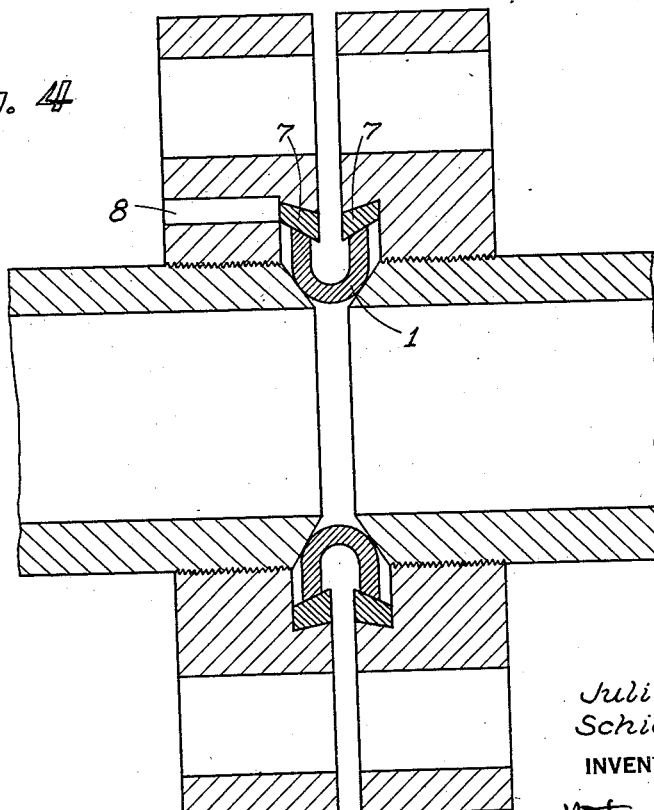
Fig. 4 is a longitudinal section of a modified form showing wedge rings 7, 7 for each flange.

Disassembly of the joint of the aforesaid kind is only possible by sawing or burning through the connecting wedges 4. Since this fact is frequently troublesome in the case of joints which it is desired to disassemble frequently, there is provided in this case, between the connecting wedges and each or one of the wedge surfaces 3, 3 of the two connecting flanges a small wedge ring 7 which is open or divided into segments. This ring may be knocked out after removing the connecting bolts by striking a mandrel into the flange bores of which one (8) is shown in Figures 1 and 4. When the wedge ring is only slightly knocked out, the connection of the flanges is loosened. It is thus possible to disassemble the joint without sawing through the connecting wedges.

The same is true of the modification according to Figure 4 in which the wedge groove is cut at the periphery of the packing ring 1 itself and in which the connecting wedges consist of smooth wedge rings 7, 7 separate for each flange divided into separate ring segments in order to be more easily inserted or removed, which are pressed between the wedge surfaces of the packing ring and of the flanges.

What I claim is:

1. Flanged joint of tubular conduits consisting of a steel packing ring, the faces of which are pressed from the outside against the slopingly turned ends of the conduits to be joined by means of connecting wedges which are divided in ring segments and provided with wedge-shaped grooves cut in their outer surface whereby the wedge surfaces are less sloped to the axis of the conduits than the slopingly turned ends of the conduits, and pressed between the outer periphery of the said packing ring and the correspondingly turned wedge surfaces of the connecting flanges by drawing together the flange connecting bolts.

2. Flanged joint of tubular conduits as claimed in claim 1 wherein the packing ring has a U-shaped cross-section.

3. Flanged joint of tubular conduits as claimed in claim 1 wherein between the connecting wedges and at least one of the wedge surfaces of the connecting flanges a small wedge ring is provided which can be knocked out after removing the connecting bolts by striking a mandrel into bores put in the flanges.

4. Flanged joint of tubular conduits as claimed in claim 1 wherein between the connecting wedges and at least one of the wedge surfaces of the connecting flanges a small open wedge ring is provided which can be knocked out after removing the connecting bolts by striking a mandrel into bores put in the flanges.

5. Flanged joint of tubular conduits as claimed in claim 1 wherein between the connecting wedges and at least one of the wedge surfaces of the connecting flanges a small wedge ring divided into segments is provided which can be knocked out after removing the connecting bolts by striking a mandrel into bores put in the flanges.

6. Flanged joint of tubular conduits as claimed in claim 1 wherein the wedge rings provided between the packing ring correspondingly turned on the outer periphery and the connecting flanges replace the connecting wedges.

7. Flanged joint of tubular conduits as claimed in claim 1 whereby in the flanges radial grooves are provided on sides opposed to each other for introducing through them the connecting wedges in the form of ring segments before the flange connecting bolts are drawn together.

JULIUS SCHIERENBECK.